US008612607B2

(12) United States Patent
Varga et al.

(10) Patent No.: US 8,612,607 B2
(45) Date of Patent: Dec. 17, 2013

(54) SUBMIT REPORT HANDLING IN SMSIP

(71) Applicant: Nokia Corporation, Espoo (FI)

(72) Inventors: Jozsef Varga, Nagydobsza (HU); Gyorgy Tamas Wolfner, Budapest (HU)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/631,783

(22) Filed: Sep. 28, 2012

(65) Prior Publication Data

US 2013/0097331 A1    Apr. 18, 2013

Related U.S. Application Data

(63) Continuation of application No. 12/524,533, filed as application No. PCT/IB2008/000181 on Jan. 28, 2008, now Pat. No. 8,307,104.

(60) Provisional application No. 60/897,819, filed on Jan. 29, 2007.

(51) Int. Cl.
*G06F 15/16* (2006.01)

(52) U.S. Cl.
USPC ........................................................ 709/227

(58) Field of Classification Search
USPC ................................................ 709/227–228
See application file for complete search history.

(56) References Cited

U.S. PATENT DOCUMENTS

| 7,715,856 | B2 | 5/2010 | Shaheen | |
|---|---|---|---|---|
| 2003/0043992 | A1 | 3/2003 | Wengrovitz | |
| 2004/0008656 | A1* | 1/2004 | Qu et al. | 370/342 |

(Continued)

FOREIGN PATENT DOCUMENTS

| WO | WO-03024062 A2 | 3/2003 |
|---|---|---|
| WO | WO-2005025180 A1 | 3/2005 |
| WO | WO-2005036902 A3 | 12/2005 |
| WO | WO-2005122604 A3 | 8/2007 |

OTHER PUBLICATIONS

3GPP TS 24.229, v5.18.0, 3rd Generation Partnership Project; Technical Specification Group Core Network and Terminals; IP Multimedia Call Control Protocol based on Session Initiation Protocol (SIP) and Session Description Protocol (SDP); Stage 3 (Release 5), Sep. 2006.

(Continued)

*Primary Examiner* — Jason Recek
(74) *Attorney, Agent, or Firm* — Mintz, Levin, Cohn, Ferris, Glovsky & Popeo, P.C.

(57) ABSTRACT

Submit report handling in Short Message Session Initiation Protocol (SMSIP) is provided. For example, a method can include preparing a submit report, wherein the preparing includes using a combination of forking and an in-reply-to header to find an appropriate terminal. The method can also include sending the submit report to the appropriate terminal. Likewise, another method can include receiving, by an apparatus, a session initiation protocol message request including a submit report. The method can also include processing the submit report to determine whether the request corresponds to a message sent by the apparatus. The method can further include sending, when the submit report is determined not to correspond to any message sent by the apparatus, a not-acceptable-here session initiation protocol response. The method can additionally include sending, when the submit report is determined to correspond to the message sent by the apparatus, an ok session initiation protocol message.

8 Claims, 3 Drawing Sheets

(56) References Cited

U.S. PATENT DOCUMENTS

| | | | |
|---|---|---|---|
| 2004/0230697 | A1 | 11/2004 | Kiss et al. |
| 2005/0282565 | A1 | 12/2005 | Shaheen |
| 2006/0004924 | A1 | 1/2006 | Trossen |
| 2006/0084454 | A1* | 4/2006 | Sung et al. ............... 455/518 |
| 2006/0095522 | A1 | 5/2006 | Rang et al. |
| 2007/0100941 | A1* | 5/2007 | Lee et al. ............... 709/204 |
| 2007/0123277 | A1 | 5/2007 | Harris et al. |
| 2007/0147240 | A1* | 6/2007 | Benveniste ............... 370/230 |
| 2007/0254648 | A1* | 11/2007 | Zhang et al. ............... 455/433 |
| 2007/0298817 | A1 | 12/2007 | Alfano et al. |

OTHER PUBLICATIONS

3GPP TS 23.040, V6.8.1, 3rd Generation Partnership Project; Technical Specification Group Core Network and Terminals; Technical realization of the Short Message Service (SMS) (Release 6), Oct. 2006.

3GPP TS 24.011, V6.0.0, 3rd Generation Partnership Project; Technical Specification Group Core Network; Point-toPoint (PP) Short Message Service (SMS) support on mobile radio interface (Release 6), Sep. 2003.

IETF RFC 3841, Caller Preferences for the Session Initiation Protocol (SIP), IETF, Aug. 2004, pp. 1-26.

Office Action from corresponding Russian Application No. 2009132357, dated Jul. 8, 2010.

3GPP: "Support of SMS over IP Networks; Stage 3 (Release 7)", 3GPP TS 24.341 V1.0.0, Nov. 2006, XP002496274, 3GPP, Section 3-5, Annex A.5.

"Session Initiation Protocol (SIP) Extension for Instant Messaging; rfc3428.txt", IETF, Dec. 1, 2002, XP015009171.

3GPP: "3GPP TS 23.204 v7.1.0 (Dec. 2006)—3rd Generation Partnership Project; Technical Specifiaction Group Services and System Aspects; Support of Short Message Service (SMS)—over generic 3GPP Internet Protocol (IP) access; Stage 2—(Release 7)", Dec. 1, 2006, 3rd Generation Partnership Project (3GPP); Technical Specifications (TS), pp. 1-16, X.

Rosenberg, et al., "SIP: Session Inititation Protocol", Jun. 1, 2002, pp. 1-269.

Nokia: "Terminating SMS over IP"; C1-062059, Oct. 30, 2006, Nov. 3, 2006_; 3GPP TSG CT WG#44.

Huawei: "The issue of the SMS submit report"; S2-070194, Jan. 15, 2007-Jan. 19, 2007; 3GPP TSG SA WG2 Architecture S2#56.

Nokia: "Forking Issues"; C1-070336, Feb. 5, 2007-Feb. 9, 2007; 3GPP TSG CT WG1 Meeting #45.

International Search Report and the Written Opinion of the International Searching Authority, received in corresponding PCT Application No. PCT/IB2008/000181, dated Dec. 3, 2008.

\* cited by examiner

SUBMIT REPORT HANDLING IN SMSIP

This application is a continuation of U.S. patent application Ser. No. 12/524,533, entitled "SUBMIT REPORT HANDLING IN SMSIP," filed Dec. 9, 2009, which is a National Stage Entry of PCT Application No. PCT/IB08/00181, filed Jan. 28, 2008, which claims priority under 35 U.S.C. §119 to U.S. Provisional Application Ser. No. 60/897,819, filed on Jan. 29, 2007. The subject matter of all of these applications is hereby incorporated by reference in their entirety.

BACKGROUND OF THE INVENTION

1. Field of the Invention

The present invention generally relates to telecommunications. For example, the present invention can relate to Internet Protocol (IP) networks. In certain embodiments, the present invention specifically relates to Short Message Service (SMS) signaling over IP networks and SMS termination in an IP Multimedia Subsystem (IMS), as well as SMS more generally.

2. Description of the Related Art

In conventional SMS termination in IP Multimedia Subsystem (IMS) applications, Session Initiation Protocol (SIP) is used for initiating and controlling service requests. The conventional art does not provide a way to ensure that a submit report is targeted to the terminal that is submitting the short message.

SUMMARY OF THE INVENTION

One embodiment of the present invention is a method. The method includes preparing a submit report, wherein preparing the submit report includes using a combination of forking and an in-reply-to header to find an appropriate device. The method also includes sending the submit report to the appropriate device.

Another embodiment of the present invention is also a method. The method includes receiving, by an apparatus, a session initiation protocol message request including a submit report. The method also includes processing the submit report to determine whether the request corresponds to a message sent by the apparatus. The method further includes sending, when the submit report is determined not to correspond to any message sent by the apparatus, a not-acceptable-here session initiation protocol response, and sending, when the submit report is determined to correspond to the message sent by the apparatus, an ok session initiation protocol message.

Another embodiment of the present invention is an apparatus. The apparatus includes processing means for preparing a submit report, wherein preparing the submit report includes using a combination of forking and an in-reply-to header to find an appropriate device. The apparatus further includes transmitting means for sending the submit report to the appropriate device.

A further embodiment of the present invention is also an apparatus. The apparatus includes receiving means for receiving a session initiation protocol message request including a submit report. The apparatus also includes processing means for processing the submit report to determine whether the request corresponds to a message sent by the apparatus. The apparatus further includes transmitting means for sending, when the submit report is determined not to correspond to any message sent by the apparatus, a not-acceptable-here session initiation protocol response, and for sending, when the submit report is determined to correspond to the message sent by the apparatus, an ok session initiation protocol message.

A further embodiment of the present invention is another apparatus. The apparatus includes a processor configured to prepare a submit report, wherein preparing the submit report includes using a combination of forking and an in-reply-to header to find an appropriate device. The apparatus also includes a transmitter configured to send the submit report to the appropriate device.

An additional embodiment of the present invention is also an apparatus. The apparatus includes a receiver configured to receive a session initiation protocol message request including a submit report. The apparatus further includes a processor configured to process the submit report to determine whether the request corresponds to a message sent by the apparatus. The apparatus also includes a transmitter configured to send, when the submit report is determined not to correspond to any message sent by the apparatus, a not-acceptable-here session initiation protocol response, and to send, when the submit report is determined to correspond to the message sent by the apparatus, an ok session initiation protocol message.

Another embodiment of the present invention is a computer program embodied on a computer-readable medium, and encoding instructions for performing a method when executed in hardware. The method includes preparing a submit report, wherein preparing the submit report includes using a combination of forking and an in-reply-to header to find an appropriate device. The method also includes sending the submit report to the appropriate device.

A further embodiment of the present invention is also a computer program embodied on a computer-readable medium, and encoding instructions for performing a method when executed in hardware. The method includes receiving, by an apparatus, a session initiation protocol message request including a submit report. The method also includes processing the submit report to determine whether the request corresponds to a message sent by the apparatus. The method further includes sending, when the submit report is determined not to correspond to any message sent by the apparatus, a not-acceptable-here session initiation protocol response, and sending, when the submit report is determined to correspond to the message sent by the apparatus, an ok session initiation protocol message.

DESCRIPTION OF THE PREFERRED EMBODIMENTS

Figure 1:
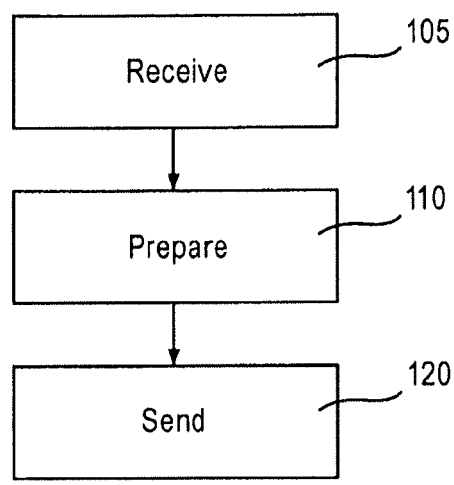
FIG. 1 depicts an example of a method in accordance with some exemplary embodiments.

Communication can occur in wireless communication networks and systems, such as Third Generation Project (3GPP), wherein SMS messages are sent from one user terminal to another user terminal. SMS messages, or short message service messages, are typically sent over networks operating on a communication protocols such as Internet Protocol (IP). The SMS can be terminated in the IP multimedia subsystems (IMS), and utilizes Session Initiation Protocol (SIP) for initiating and controlling service request. The specifications of such SIP protocol details can be found, for example, in 3GPP Technical Specification (TS) 24.229. The contents of this technical specification are hereby incorporated by reference.

The functionality of SMS over IP is defined in 3GPP TS 23.204 and 24.341. The contents of these documents are hereby incorporated by reference in their respective entireties. General SMS functionality is described, for example, in 3GPP TS 23.040 and TS 24.011, which are also hereby incorporated by reference in their respective entireties.

In one example, two pieces of user equipment can share one IMS Public User Identity (IMPU), with all having SMSIP capability. When the user equipments (UEs) are registered to the IMS network, one user equipment may identify its priority as being higher than the other user equipment in the registration procedure. When one of these two user equipments sends an SMS message to a third piece of user equipment, it is possible for the Short Message Service Center (SM-SC) to send a submit report to the sender. However, if sequential forking is being used, it is possible that the submit report may not properly directed to the sender. The other piece of user equipment may erroneously receive a submit report in a case parallel forking is being used.

Likewise, whenever a short message is submitted from a terminal having a shared mobile subscriber integrated services digital network number (MSISDN), the submit report termination can (conventionally) be ambiguous. Thus, conventionally, it can happen that a submit report goes to a terminal other than the one that submitted the short message.

According to certain embodiments of the present invention, whenever a SIP MESSAGE request encapsulating SMS-submit-report is sent, the Internet Protocol-Short Message-Gateway (IP-SM-GW) can insert a Request-Disposition header indicating either parallel or sequential forking, and can insert an In-Reply-To header with the call-identification (ID) or Reply-To header of the SIP MESSAGE request that encapsulated the submitted short message. The Serving-Call Session Control Function (S-CSCF) can send the SIP MESSAGE request, including the submit report, toward the possible contacts, either to all contacts at once or sequentially. Any wrong attempts, such wrong attempts being attempts to direct the submit report towards a user equipment that is not submitting the short message, are rejected with, for example, a "486 not acceptable here" response. A correct attempt will result in a "200 OK" response.

The present invention can solve the targeting problem in that when the user equipment submitting a short message does not receive the submit report, the submit report is resent. Additionally, there is no need for a new SIP extension, since a unique user ID can not be a Globally Routable User Agent (UA) Uniform Resource Identifier (URI) (GRUU) for SIP MESSAGE request.

The present invention, therefore, can use a combination of forking, that is a Request-Disposition header inserted with a "fork" attribute, and an In-Reply-To header, as a mechanism to find the user equipment that submitted the short message. This can prevent the problem of the conventional art wherein a submit report can be sent to a terminal other than the terminal that submitted the short message.

In one embodiment, the invention can include a system for communicating SMS messages, the system having a first unit that sends a short message to a destination. The system can also include a second unit that inserts a header into the message, with a header including identification information regarding the sender.

Upon receipt of the message by the destination, the destination can send a response message to the sender. The response message can be targeted for receipt by the sender.

Certain embodiments of the present invention can also include a network element having a receiving unit for receiving an SMS message from a sender. The element can have a header insertion unit for inserting a header into the message, with the header including specific identification information regarding the sender. A forwarding unit can forward the message to the destination. The network element is also configured to receive a response message from the destination, and to forward the response message to the sender.

A method according to an embodiment of the invention can include sending a message from a sender to a destination, and inserting a header into the message at a Gateway. The message can then include forwarding the message to the destination, sending a response message from the destination to the sender, and receiving the response message at the sender.

FIG. 1 illustrates a first method according to an embodiment of the present invention. As illustrated in FIG. 1, the method includes preparing 110 a submit report. Preparing 110 the submit report includes using a combination of forking and an in-reply-to header to find an appropriate terminal. The method also includes sending 120 the submit report to the appropriate terminal.

The sending 120 the submit report to the appropriate terminal can include avoiding ambiguity that would otherwise result in the submit report being terminated on a terminal other than the appropriate terminal. The appropriate terminal can have a shared mobile subscriber integrated services digital network number. The appropriate terminal can be a user equipment, personal digital assistant, portable communication device, wireless terminal, wireless handheld device, personal computer, or a mobile station.

The forking can include inserting a fork attribute in a request-disposition header. The preparing 110 the submit report can be triggered by receiving 105 a short message request submitted from the appropriate terminal.

Figure 2:
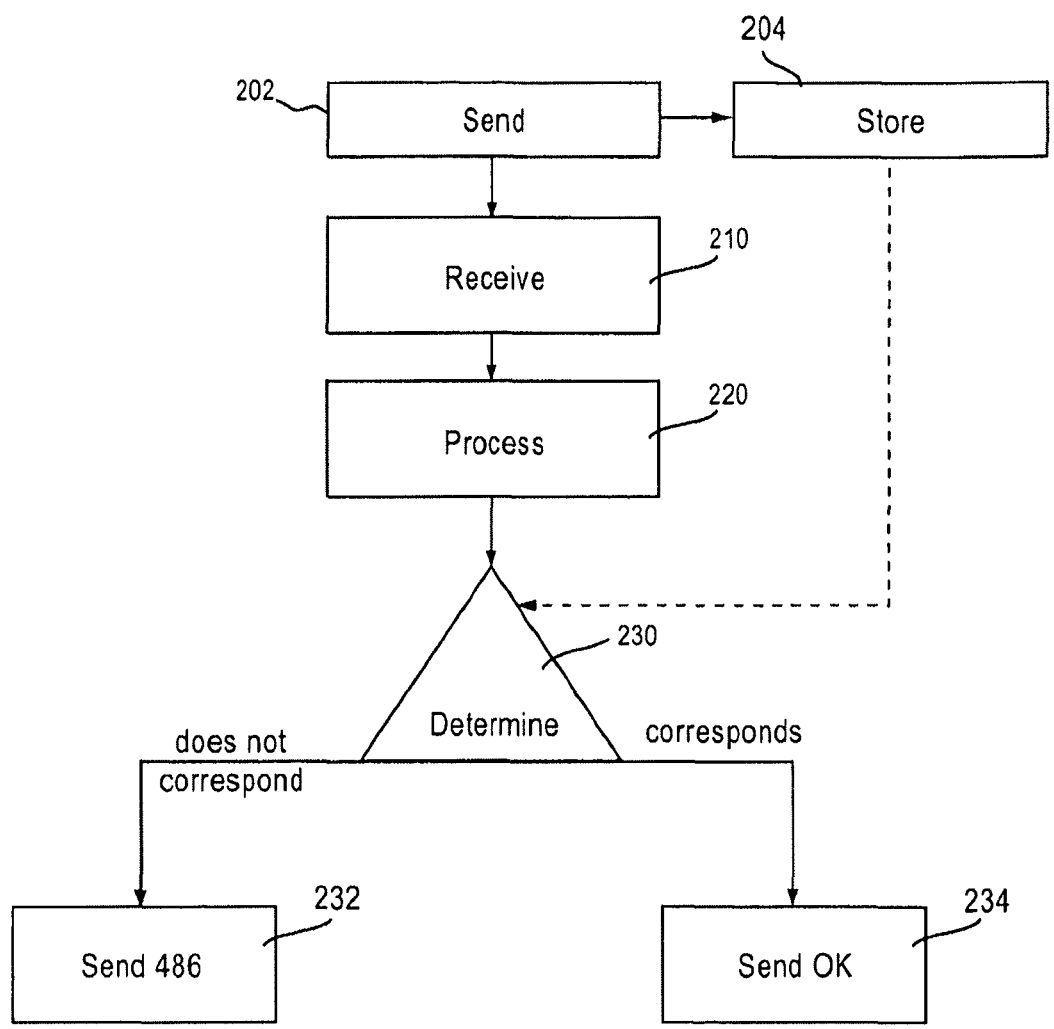
FIG. 2 depicts another example of a method in accordance with some exemplary embodiments.

FIG. 2 illustrates another method according to an embodiment of the present invention. As depicted in FIG. 2, the method can include receiving 210, by an apparatus, a session initiation protocol message request including a submit report. The method can also include processing 220 the submit report to determine whether the request corresponds to a message sent by the apparatus. The method can further include sending 232, when the submit report is determined not to correspond to any message sent by the apparatus, a not-acceptable-here session initiation protocol response. The method can additionally include sending 234, when the submit report is determined to correspond to the message sent by the apparatus, an ok session initiation protocol message.

The apparatus can be a user equipment, personal digital assistant, portable communication device, wireless terminal, wireless handheld device, personal computer, or a mobile station. The submit report can be received from and the not-acceptable-here or ok session initiation protocol message can be sent to an internet protocol short message gateway.

The method shown in FIG. 2 can also include, before the receiving 210 the submit report, sending 202 the corresponding message as a session initiation protocol message request, and storing 204 the call identification of the corresponding message.

Additionally, the method of FIG. 2 can include determining 230 that (or whether) the submit report corresponds to the corresponding message by comparing a received call identification in the submit report with the call identification previously stored.

The methods illustrated in FIGS. 1 and 2 can be implemented in hardware, software, or a combination thereof. For example, a computer program can be embodied on a computer-readable medium, and can encode instructions for performing the methods of FIG. 1 and/or FIG. 2 when executed in hardware.

Figure 3:
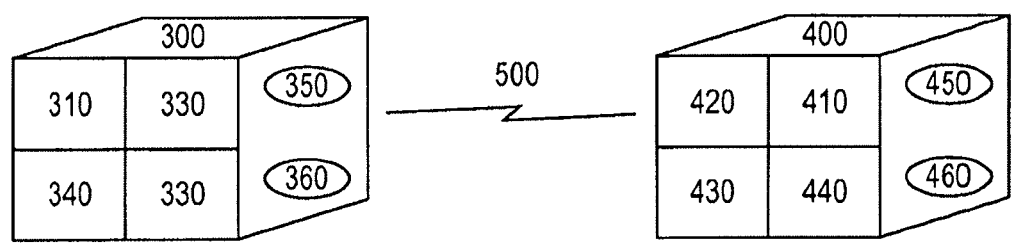
FIG. 3 depicts an example of a system in accordance with some exemplary embodiments.

FIG. 3 illustrates a system according to an embodiment of the present invention. The system includes a first apparatus 300 (which can be an internet protocol short message gateway) and a second apparatus 400. The first apparatus 300 and the second apparatus 400 can include respective receivers 310, 410, processors 320, 420, transmitters 330, 430, and memories 340, 440. The first apparatus 300 and the second apparatus 400 can be configured to provide various functions, as will be discussed below. From another perspective, the first apparatus 300 and the second apparatus 400 can provide various functional configurations using hardware 350, 450, software 360, 360 or a hybrid thereof.

The first apparatus 300 and the second apparatus 400 can be connected over a communication link 500, which may be a wireless link, a wireline link, or a combination of wireless and wireline. Intermediate elements that may relay signaling between the first apparatus 300 and the second apparatus 400 are omitted for ease of illustration.

The first apparatus 300 and the second apparatus 400, for hardware 350, 450 can be provided with a general purpose computer, Application Specific Integrated Circuit (ASIC) or similar equipment, which can, in certain embodiments, be used as the processor 320, 420. Likewise, the first apparatus 300 and the second apparatus 400, can be equipped with network communication equipment for communicating in a network, such as an Internet Protocol (IP) network and/or a 3GPP network. Other communication equipment, such as antennas, can be included. Furthermore, the first apparatus 300 and the second apparatus 400 can have, for their memory 340, 440, a hard drive, flash Random Access Memory (RAM), a Electronically Programmable Read Only Memory (EPROM), a removable disk memory, or the like.

Thus, the first apparatus 300 can be configured to prepare a submit report, wherein preparing the submit report includes using a combination of forking and an in-reply-to header to find an appropriate terminal (such as second apparatus 400). The first apparatus 300 can also be configured to send the submit report to the appropriate terminal.

The sending the submit report to the appropriate terminal can include avoiding ambiguity that would otherwise result in the submit report being terminated on a terminal other than the appropriate terminal. The forking can include inserting a fork attribute in a request-disposition header.

The appropriate terminal can have a shared mobile subscriber integrated services digital network number, and can be a user equipment, personal digital assistant, portable communication device, wireless terminal, wireless handheld device, personal computer, or a mobile station.

The first apparatus 300 can additionally be configured to receive a short message request submitted from the appropriate terminal, and to trigger the preparation of the submit report upon receipt of the short message request.

The second apparatus 400 can be configured to receive a session initiation protocol message request comprising a submit report. The second apparatus 400 can also be configured to process the submit report to determine whether the request corresponds to a message sent by the apparatus. The second apparatus 400 can further be configured to send, when the submit report is determined not to correspond to any message sent by the apparatus, a not-acceptable-here session initiation protocol response, and to send, when the submit report is determined to correspond to the message sent by the apparatus, an ok session initiation protocol message.

The second apparatus 400 can be a user equipment, personal digital assistant, portable communication device, wireless terminal, wireless handheld device, personal computer, or a mobile station.

The submit report can be received from and the not-acceptable-here or ok session initiation protocol message can be sent to the first apparatus 300, which can be an internet protocol short message gateway.

The second apparatus 400 can be configured to, before receiving the submit report, send the corresponding message as a session initiation protocol message request, and to store the call identification of the corresponding message.

Furthermore, the second apparatus 400 can be configured to determine that the submit report corresponds to the corresponding message by comparing a received call identification in the submit report with the call identification previously stored.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. An apparatus, comprising:
   at least one processor; and
   at least one memory including computer program code for one or more programs, the at least
   one processor, the at least one memory, and the computer program code configured to cause the apparatus to perform at least the following:
   receive a session initiation protocol message request comprising a submit report;
   process the submit report to determine whether the request corresponds to a message sent by the apparatus;
   send, when the submit report is determined not to correspond to the message sent by the apparatus, a not-acceptable-here session initiation protocol response; and
   send, when the submit report is determined to correspond to the message sent by the apparatus, an ok session initiation protocol message.

2. The apparatus of claim 1, wherein the apparatus is a user equipment, personal digital assistant, portable communication device, wireless terminal, wireless handheld device, personal computer, or a mobile station.

3. The apparatus of claim 1, wherein the submit report is received from, and the not-acceptable-here or ok session initiation protocol message is sent to, an internet protocol short message gateway.

4. The apparatus of claim 1, wherein the processing further comprises determining that the submit report corresponds to the message sent by the apparatus by comparing a received call identification in the submit report with a call identification previously stored.

5. A non-transitory computer-readable medium encoded with instructions that when executed, perform at least the following:
   receiving, by an apparatus, a session initiation protocol message request comprising a submit report;
   processing the submit report to determine whether the request corresponds to a message sent by the apparatus;

sending, when the submit report is determined not to correspond to a message sent by the apparatus, a not-acceptable-here session initiation protocol response; and sending, when the submit report is determined to correspond to the message sent by the apparatus, an ok session initiation protocol message.

6. A method comprising:

receiving, at an apparatus, a session initiation protocol message request comprising a submit report;

processing, at the apparatus, the submit report to determine whether the request corresponds to a message sent by the apparatus;

sending, from the apparatus, when the submit report is determined not to correspond to the message sent by the apparatus, a not-acceptable-here session initiation protocol response; and sending, from the apparatus, when the submit report is determined to correspond to the message sent by the apparatus, an ok session initiation protocol message.

7. The method of claim 6, wherein the submit report is received from, and the not-acceptable-here or ok session initiation protocol message is sent to, an interne protocol short message gateway.

8. The method of claim 6, wherein the processing further comprises determining that the submit report corresponds to the message sent by the apparatus by comparing a received call identification in the submit report with a call identification previously stored.

\* \* \* \* \*